United States Patent [19]
Maskery

[11] 3,920,285
[45] Nov. 18, 1975

[54] RAIL TRAIN VEHICLE BRAKE CONTROL APPARATUS UTILIZING COMMON ANALOG CONTROL AND A.C. SUPPLY SIGNALS

[75] Inventor: Arthur Maskery, London, England

[73] Assignee: Westinghouse Brake & Signal Co., Ltd., London, England

[22] Filed: Feb. 14, 1974

[21] Appl. No.: 442,690

[30] Foreign Application Priority Data
Feb. 27, 1973 United Kingdom............... 09631/73

[52] U.S. Cl.................... 303/22 R; 188/195; 303/3; 303/15; 303/20
[51] Int. Cl.²........................................... B60T 8/18
[58] Field of Search............. 188/195; 303/3, 9, 13, 303/15, 20, 22 R

[56] References Cited
UNITED STATES PATENTS
| | | |
|---|---|---|
| 3,304,131 | 2/1967 | Bueler............................ 303/13 X |
| 3,398,815 | 8/1968 | Brath et al. ................... 303/22 R X |
| 3,398,993 | 8/1968 | Sarbach et al. ....................... 303/20 |
| 3,547,499 | 12/1970 | Maskery ............................. 303/3 X |

Primary Examiner—Trygve M. Blix
Assistant Examiner—Stephen G. Kunin
Attorney, Agent, or Firm—Larson, Taylor and Hinds

[57] ABSTRACT

A brake control apparatus for rail car brakes is controlled in service by an applied analogue d.c. or variable mark-space d.c. signal supplied over the length of the train by a train-wire and an emergency train-wire is also included over which analogue electronic blending units on each car are supplied with and a.c. signal such that in an emergency such as a line fault interrupting the emergency wire current, the supplies to the blending units are interrupted.

6 Claims, 6 Drawing Figures

RAIL TRAIN VEHICLE BRAKE CONTROL APPARATUS UTILIZING COMMON ANALOG CONTROL AND A.C. SUPPLY SIGNALS

This invention relates to brake control apparatus and relates particularly to a brake control apparatus having control signal responsive means and emergency control means especially but not exclusively for railway braking systems.

According to the invention there is provided rail train vehicle apparatus including a control input for receiving, in common with other vehicles of a train, an analog control signal input representing a desired degree of braking, an a.c. supply signal input for receiving, in common with other vehicles of the train, an a.c. supply current, and an electrically operating braking control signal processing apparatus, which is connected to the control signal input and the a.c. supply input and further receives an input representative of dynamic braking and which, in operation, is powered, apart from the control signal, only by the power derived from the a.c. supply current, for producing a brake control signal output for an electro-pneumatic brake.

The analog signal preferably comprises a d.c. current analog signal and the control signal processing apparatus preferably includes an electro-pneumatic conversion means and a d.c. current transformer and rectifier which receive the d.c. current analog signal and are energized from the a.c. signal input to provide an input current to the electro-pneumatic conversion means.

The control signal processing apparatus also includes, in a preferred embodiment, an inverter modulator operable in response to the output of the transformer and rectifier to produce an inverted output signal, the magnitude of which varies in inverse relationship relative to the d.c. analog signal, and means responsive to the inverted output signal and a signal representative of loading of the vehicle to produce a further load-weighed signal which is connected to the electro-pneumatic conversion means.

The d.c. analog signal advantageously comprises a variable mark-space d.c. signal and, in a preferred embodiment, the control signal processing apparatus further includes a first gate which is connected to the a.c. signal input and is operable to gate out the a.c. input thereto in accordance with the mark-to-space ratio of the d.c. signal, a transducer connected to receive the output of the first gate, for producing a load-weighed output dependent upon the vehicle loading, an inverter connected to receive the d.c. signal, a further gate connected to the a.c. signal input and to the output of the inverter for gating out the a.c. signal input thereto in inverse relationship to the mark-to-space ratio of the d.c. signal to produce a further output signal, and means for combining the further output signal with the load-weighed signal to produce a brake control signal related to the weight of the vehicle.

In order that the invention may be more clearly understood and readily carried into effect, the same will be further described by way of example with reference to the accompanying drawings in which.

Before referring to the drawings the surrounding circumstances may be clarified with regard to the manner of application of the invention. The invention is intended primarily for use in braking of permanently coupled cars of a train. Typically, the train may be a nine-car unit with only two brake controllers or automatic train control equipments per train. It is proposed moreover that common functions such as jerk control, speed taper and power supplies may be incorporated at the two end controllers thereby reducing the complexity which is involved when such means are required to be provided on individual units of separable cars of a train.

As will be seen, service braking is controlled from a d.c. analogue current signal functioning in an "energise-to-release mode", the energise-to-release mode being maintained throughout the apparatus. A typical range of the control signal is from 0.5 amps for full release to 0.1 amps corresponding to full service. In coasting or motoring modes an additional non jerk-limited increment in the control signal may be made to ensure that full release of the brakes is achieved.

For the purposes of full service brake applications, the control apparatus output falls to a finite value corresponding to the required brake cylinder pressure. During an emergency application all power is removed from the control unit and the output falls to zero giving an enhanced emergency pressure. The correct emergency pressure is determined by a load cut-off valve forming part of the pneumatic equipment as will be seen hereafter.

As indicated above, power supplies for the braking apparatus on each car are common and form part of the controller or cab equipment which is in use at any given time. The power is transmitted in accordance with the invention along the a.c. supply wire and in order to provide for a degree of voltage limiting of the emergency signal and supply, the power to the respective units on each car is derived via a suitable saturable isolating and regulated transformer.

Figure 1:
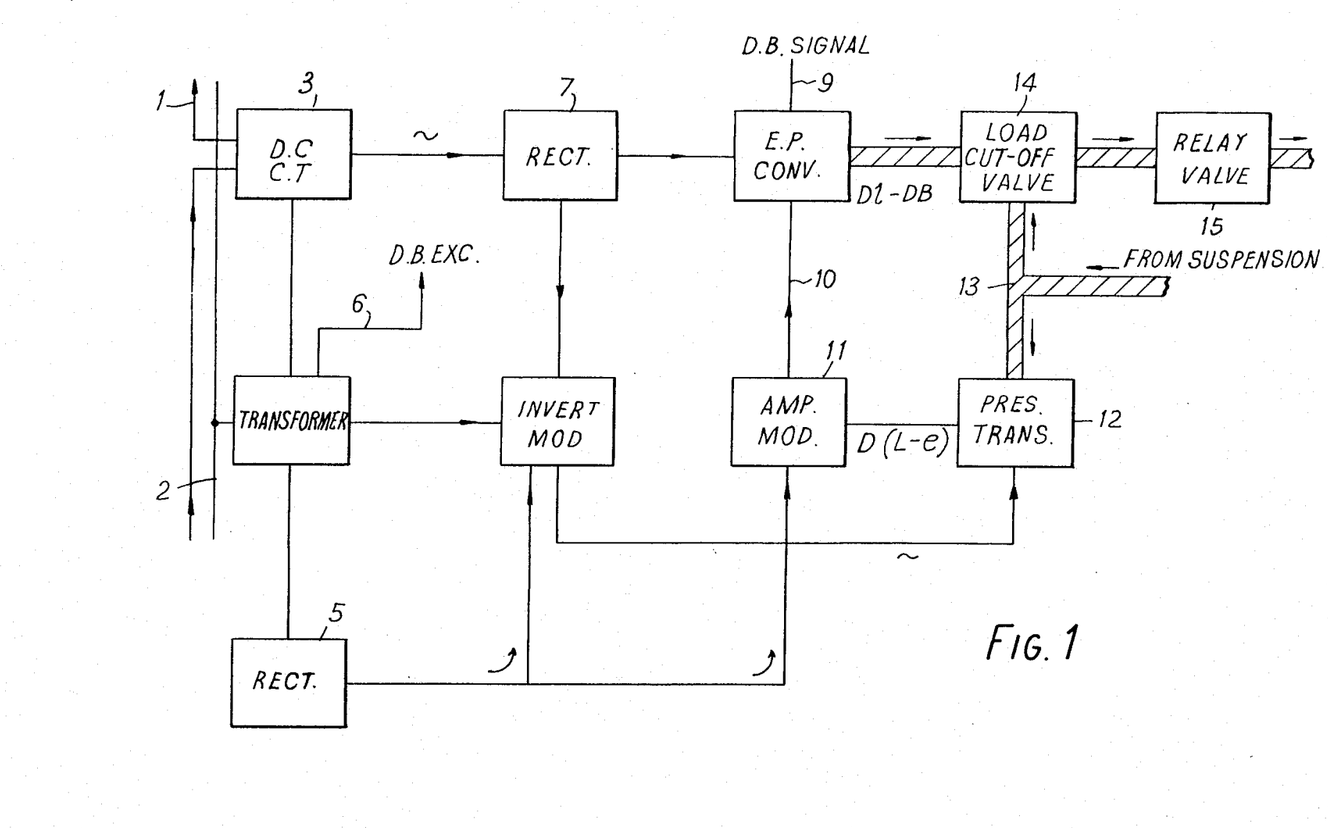
FIG. 1 illustrates mainly in block diagrammatical form, a brake control apparatus embodying the invention, FIG. 2 gives graphical illustrations to be referred to, FIG. 3 illustrates mainly in block diagrammatical form, a preferred brake control apparatus embodying the invention.

Referring to FIG. 1, this shows in block schematic form the controlling part of the braking apparatus on a single car of a permanently coupled multi-car train. Further, the car under consideration is an intermediate car, that is it is not one which is provided with the power supplies and other common functions referred to above. Basically, two control circuits are relevant to the apparatus. These comprise the d.c. control analogue signal circuit denoted by reference 1 and the a.c. supply wire circuit denoted by reference 2, which as mentioned above has the additional function of serving as an energency wire. The d.c. control signal passes through the d.c. control winding of a d.c. current transformer 3, the supply to which is derived from an isolating and regulating transformer 4 which is normally energised from the emergency wire 2 which passes the full length of the train. A further a.c. output from the transformer 4 supplies a rectifier 5 which provides a subsidiary d.c. supply to further parts of the system.

Yet another output from the transformer 4 provides an excitation over the connection 6 to a dynamic brake sensing unit, the details of which form no part of the invention but the output from which will be referred to again hereafter. The a.c. output from the transformer 3 is applied to a rectifier 7 which thus provides a command input d.c. signal to an E.P. converter denoted by reference 8. This input signal is scaled to correspond to the required braking effort for a fully loaded vehicle. The E.P. converter 8 has two further inputs at 9 and 10 as shown, the input 9 being a dynamic brake torque feed-back signal and the input 10 being derived from an amplifier demodulator 11 corresponding to the amount by which the output of electro-pneumatic converter is required to be reduced to produce a pneumatic output pressure which corresponds to the actual degree of loading of the vehicle. For this purpose, the rectifier 7 provides a further d.c. output signal which is applied to an inverter and amplitude modulator 6. This inverter and modulator is supplied by an a.c. signal from the transformer 4 and by the d.c. signal from the rectifier 5. The a.c. output signal of the inverter 6 is thus a signal which is the "inversion" of the d.c. input which corresponds to the fully loaded command signal. Thus the output from 6 increases as the d.c. input signal thereto derived from the rectifier 7, falls. The a.c. output from 6 is applied to a pressure transducer 12 which receives an input pressure from the suspension of the vehicle via the pipe 13 and proportions an output signal, applied to the amplifier demodulator 11, to the difference between a set full load condition and the actual load condition of the vehicle. Thus the input on the line 10 to the E.P. converter is similarly proportioned. The output from the electro-pneumatic converter is applied to a load cut-off 14 valve which is also controlled by the suspension pressure at the input 13 and the output from the load cut-off valve 14 is applied to a relay valve 15 which controls the degree of braking pressure applied from a reservoir to the brake cylinders.

It is important to appreciate that the control signal to the E.P. converter 8 is a command signal corresponding to the braking effort required for a fully loaded vehicle. The control on the line 10 is thus a decrementing input and this decrements the output from the electro-pneumatic converter in accordance with the loading on the vehicle as determined by the signal derived from the pressure transducer 12. The load cut-off valve is effective to limit the maximum braking pressure that can be called for by the relay valve 15 under all conditions of the loading of the vehicle. Thus for an empty loaded vehicle, the load cut-off valve will permit a substantially reduced maximum level of braking pressure to be called for by the relay valve 15.

By virtue of the energisation of the isolating and regulating transformer, the inverter and modulator, and the amplifier demodulator 11, from the emergency wire which carries an a.c. supply, in the event of a break occurring in the chain or in the power supply, the apparatus fails to a full braking condition governed only by the suspension pressure which is applied at the input 13 and which, as illustrated above, limits the maximum braking which can be called for by the relay valve 15.

If the d.c. control signal or demand in the analogue signal wire 1 is proportional to D, and the maximum loading of the vehicle is L, the signal appearing at the input to the E.P. converter is proportional to DL. Assuming therefore that the actual loading of the vehicle is $l$, and the input to the pressure transducer and multiplier 12 being the inverse of D, the input 10 connection carries an electrical signal which is proportional to $D(L-l)$. The output pressure which therefore appears at the output of the converter 8, is proportional to Dl − DB where DB is a representation of the dynamic braking effort which is being contributed.

Figure 2:
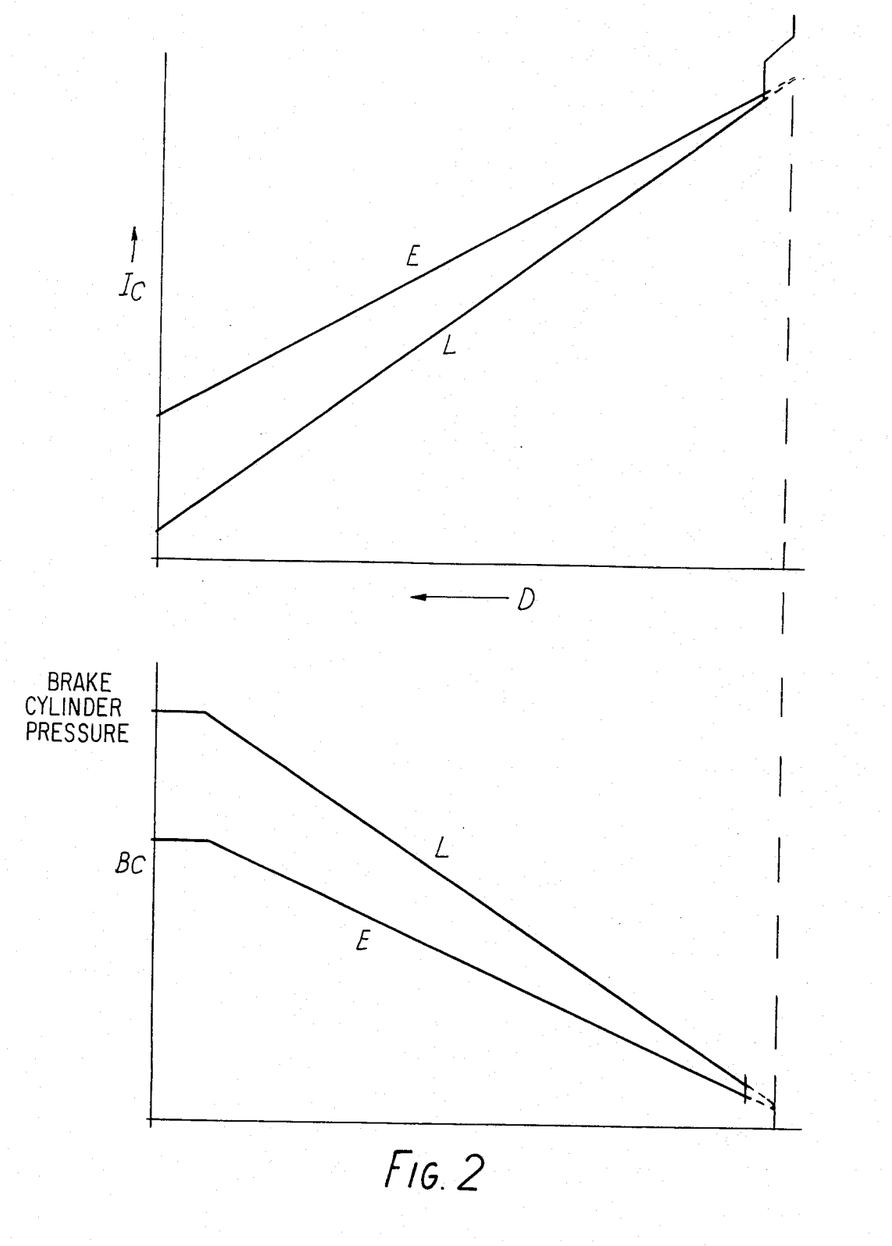

Referring to FIG. 2, this shows in the upper part of the diagram straight line curves labelled E and L corresponding to the demand signals output from the electro-pneumatic converter corresponding to the d.c. analogue control signal after processing and the lower graphs illustrate the brake cylinder pressures which are produced by the relay valve 15 corresponding to the empty and load conditions in response to the demands D produced in accordance with the curves in the upper graph. The effects of the load cut-off valve 14 are the horizontal portions of the curves apparent from the lower graphs of brake cylinder pressure against demand. Further, from the upper graphs it is possible to observe a step which can be built into the characteristic and whilst it forms no particular part of the invention, can ensure complete release of the brakes in the release condition.

Figure 3:
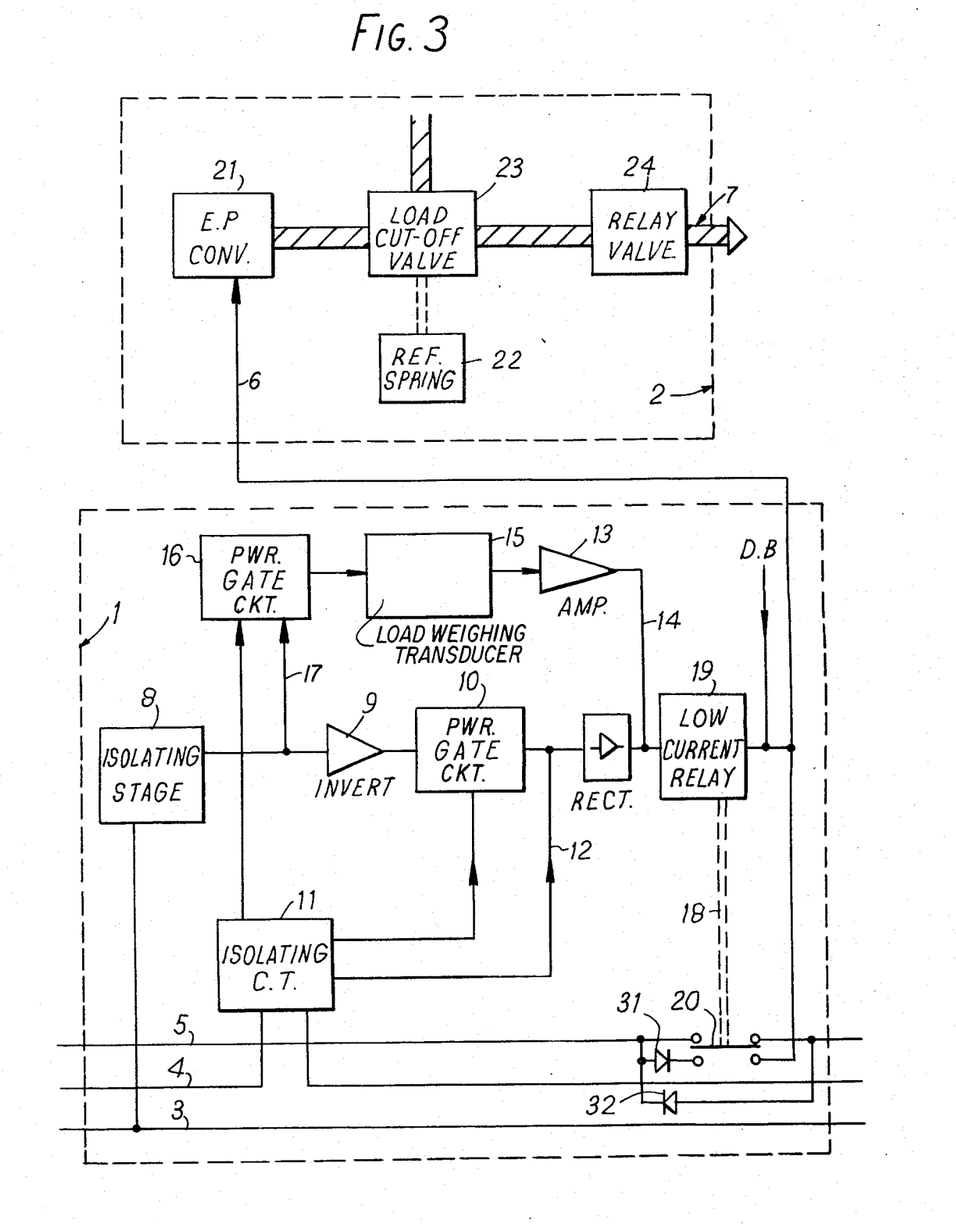

In FIG. 3, which illustrates another but preferred embodiment of the invention, the dotted outlines 1 and 2 respectively represent an analogue electronic blending unit and an analogue brake control unit. It will be understood moreover that it shows signal flow paths rather than the actual electric connection employed between blocks. The analogue electronic blending unit operates to effect in accordance with established concepts, the production of an output signal which is dependent upon the weight of a rail vehicle carrying the braking equipment to be controlled, a dynamic brake feed-back signal indicative of dynamic braking being produced by dynamic braking means, not shown, and a command input control signal indicating the degree of braking (or more strictly the degree of deceleration required to be effective on the particular car in question). The apparatus is provided essentially with three basic train lines. The train line 3 constitutes a command signal train line and carries the control input to the analogue electronic blending unit 1 together with all other analogue electronic blending units provided on further cars of a train including the overall system. The line 4 is an emergency train line and this is supplied with a constant current a.c. signal, the frequency of which is typically 5KHz and interruption of which is effective, as will be seen hereafter, to immediately cause a brake application in the manner of an emergency brake. The train line 5 constitutes a brake release train line which is energisable by a train driver to effect, as will again be seen hereafter, the release of a brake which is controlled by an analogue electronic blending unit which may for any reason fail to produce an output current to effect a brake release. The brake release train line and the command signal train line are provided with a common brake return wire which is not shown and the emergency train line in effect is the return wire of an emergency supply loop. As shown in the drawing, this emergency train line return wire returns via the analogue electronic blending unit. The output of the electronic blending unit is provided on a line denoted by the reference 6 and this is applied to the analogue brake unit which again, as will be seen hereafter, provides an output fluid pressure in the output connection denoted by the reference 7 for application to the brake cylinders of the braking apparatus controlled thereby.

Referring to the analogue electronic blending unit in greater detail, the input signal thereto is derived as aforementioned from the command signal train line 3. This input is constituted by a variable mark-to-space ratio d.c. signal which is a.c. coupled via an isolating stage 8 to an inversion circuit 9, the output of which is applied to a power gate circuit of block 10. This gating circuit is a power gate which derives a.c. power from a current transformer through the control primary which the current in the emergency train line return wire 4 passes. The output of the power gate is rectified by a rectifier and applied via a low current relay 19 to the output line 6. A further output from the current transformer 11 is applied directly to the output of the power gate circuit 10 via the connection 12. Also combined with the output of the rectifier is the output from an amplifier 13 via a line 14. The input to the amplifier 13 is a load weighed a.c. input derived from a load weighing transducer 15 which is supplied from a further power gating circuit 16 also energised from the current transformer 11 and gated by a non-inverted input such as appears at the input to the inversion circuit 9. The low current relay 19 operates via a mechanical link denoted by reference 18, and relay contacts 20 as shown. These contacts serve to interrupt the supply of brake release train line current to subsequent cars of the train in the event of the relay 19 operating, such as to confine the supply of release current to the analogue brake unit 2 alone. In this way, it is ensured that it is only possible by means of energisation of the brake release train line, to release brakes on only one car.

The blocks used in FIG. 3 all employ conventional electrical or electronic techniques and detailed description thereof is not provided. The isolating state 8 is an a.c. coupled circuit which, by being provided inter alia with a zener diode and limiting resistor, filters out high voltage spikes which may appear on the train line. The inverter 9 is a transistor inversion stage which is also powered from the transformer 11. The power gate 10 and 16 are visualised as controlled transistor bridge circuits. The transducer 15 is any suitable available transducer which operates typically by the effect of a pneumatic pressure on a variable inductance bridge and the amplifier 13 is an electronic amplifier powered from 11 and again adapted to give a d.c. output, it being understood that the signal output from 15 is a variable mark-space-variable amplitude a.c. signal.

Referring to the analogue brake unit included in the dotted outline 2, this consists of an electro-pneumatic converter denoted by the block reference 21 to which the input signal current in the line 6 is applied. This converter produces a fluid pressure output to a load control valve arrangement which is responsive to a pressure signal derived from the suspension of the vehicle to produce an output to a relay valve 24 which relays a corresponding reduction of main reservoir pressure to the fluid pressure output 7 for connection to the brake cylinders. The control valve 23 is provided with a crush-loaded car reference spring denoted by 22 and the arrangement is adjusted to act as a load cut-off valve to limit the magnitude in braking pressure which can be applied via the relay valve 24 even in the event of an emergency application.

Figure 4:
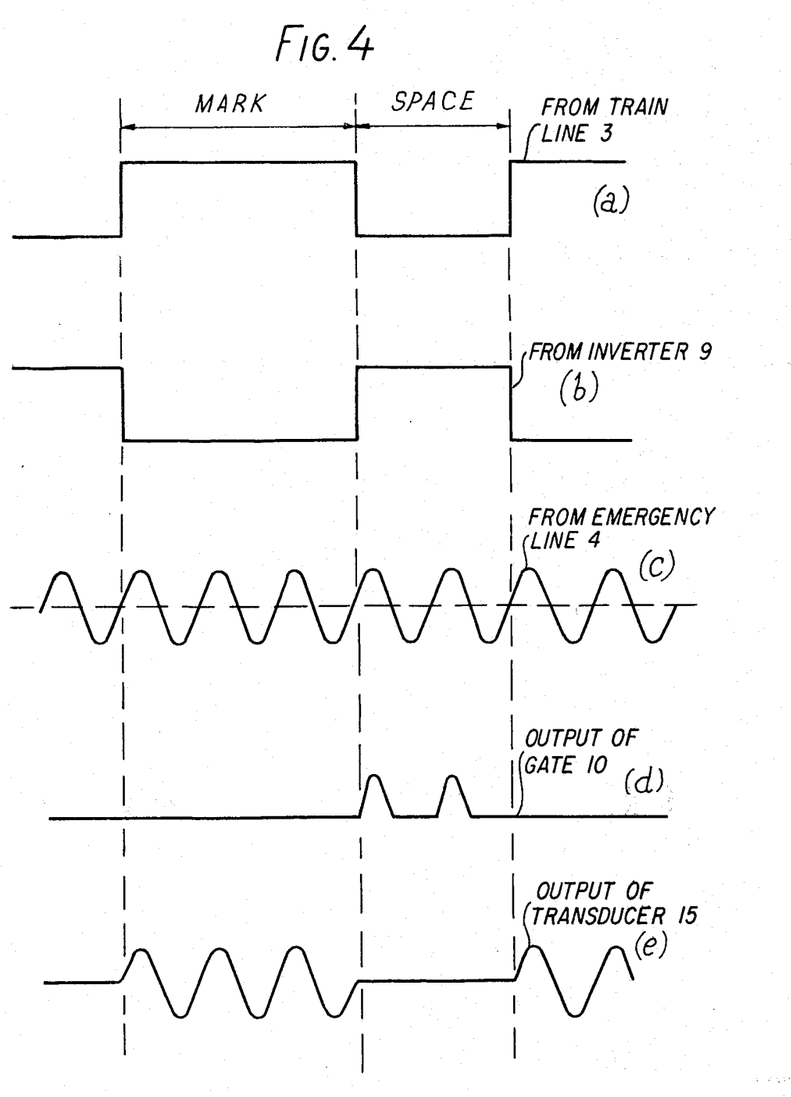
FIG. 4 illustrates electrical signal waveformers to be referred to in connection with the operation of FIG. 3.

Referring to the waveforms of FIG. 4, the current which is applied to the command signal train line 3 is represented by the waveform a and this signal is a signal which operates in the manner of an energise-to-apply signal for the brakes. An increase in the mark-to-space ratio is thus effective to command an increase in level of braking overall. Since this signal is in normal operation applied to all cars of the train, identical retardation of the respective cars is thereby called for. The signal is applied via the isolating stage 8 to the inverter which thereby means that the signal applied to the power gate 10 is effectively an energise-to-release command signal and the apparatus which follows the power gate 10 operates in an energise-to-release mode. Since the signal in the line 17 is an uninverted signal, this gates a.c. power from the isolating current transformer 11 through the load weighing transducer 15 to the amplifier 13 which produces a chopped d.c. current in the line 14, the amplitude of which increases in dependence upon the loading of the vehicle. The sense of this current is in opposition to the current derived from the power gate 10 via the rectifier. Accordingly, for increasing load as sensed in accordance with the suspension pressure applied to the load weighing transducer 15, the current applied to the electro-pneumatic converter 21 reduces to have the effect of increasing the braking forces. Conversely, when d.c. dynamic brake feed-back signal in the line DB and derived from the above mentioned dynamic braking means increases in value indicating an increase of dynamic braking, the current in the line 6 is correspondingly supplemented with the effect of reducing the braking called for by the E.P. converter 21. The energise-to-release signal which is derived from the power gate 10, is shown in the waveform b of FIG. 4, and the constant current emergency train line supply is denoted by the waveform c. It is to be emphasized moreover that this emergency train line signal, which is as shown in waveform c of FIG. 4, is utilised to power the current transformer 11 and subsequently the gates 10 and 16 and also to provide an a.c. empty car reference current signal on the line 12. There is therefore a failure of output current level from the analogue electronic blending unit in the event of the emergency train line becoming broken or de-energised. A typical energise-to-release mark-to-space ratio signal as derived from the power gate 10 is represented by the waveform d in FIG. 2, and the energisation of the transducer 15 from the uninverted output from the power gate 16 is represented by the waveform e of FIG. 4.

Figure 5:
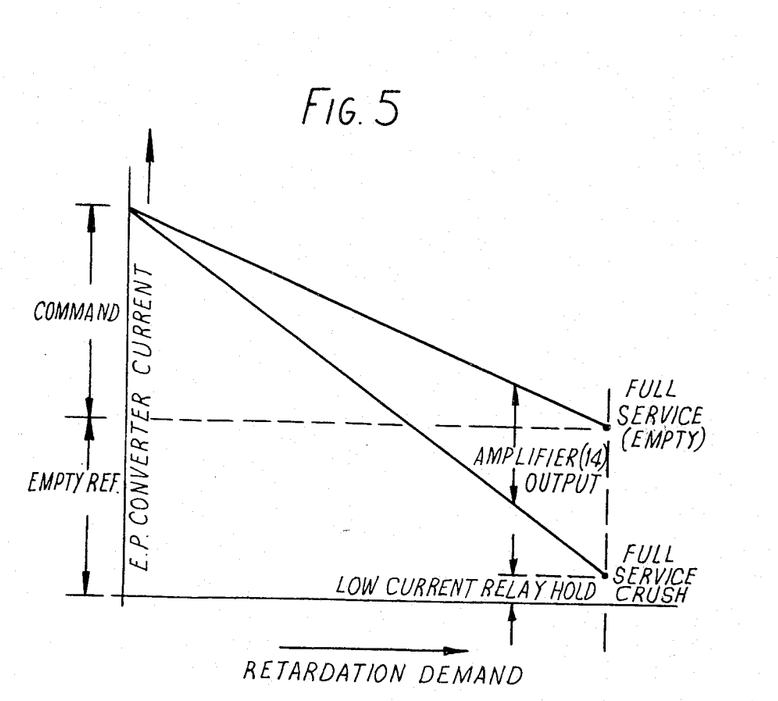
FIG. 5 illustrates graphically the control of an electro-pneumatic converter included in FIG. 3

Referring to FIG. 5, the graphical illustration of the signals which are presented in combination via the low current relay 11 to the E.P. converter via the line 6, shows the resultant current signal for the full range of command signals on the command signal line 3 for empty and crush loaded operation. It will be observed in what manner the energised-to-release command signal and empty reference signal are counteracted to a certain extent by the non-inverted output derived from the amplifier 13 which is zero for an empty car and as effective magnitude almost equal to the empty car reference signal for a full service application under crush loaded conditions. FIG. 3 assumes that the dynamic braking feed-back signal has been subtracted from the command signal.

Whilst not shown in the drawing, in a system using the apparatus, means is provided coupled to the driver's brake handle for energising the brake release train line 5 from the emergency train line 4 via a current transformer. The brake release line is therefore energised with the source a.c. current signal and therefore a constant current is applied to the brake release train line 5. With all the analogue electronic blending units properly operative, the low current relay 19 in each unit is maintained in the position shown by the always existant current flowing to the line 6 but in the event of a failure, say, resulting say, from a fault in the current transformer 11 preventing the analogue electronic blending unit operating to produce a brake release, the absence of current level in the low current relay 11 causes the relay to adopt a position opposite to that shown and the brake release train line current is therefore applied directly to the line 6 via one of the diodes 31 and 32, depending upon from which direction the brake release train line is fed. The arrangement is such moreover that operation of a low current relay in one analogue electronic blending unit has the effect of isolating subsequent units from the brake release train line current. Therefore the brake release train line current can itself only operate to release brakes on one car.

Again, whilst now shown in FIG. 3, the circuit arrangement which is controlled by the driver's brake handle to apply a current to the brake release train line can be arranged to supply such a current whenever the brake handle is placed in the release position. This is readily achieved by means of a suitable switch and by this means and the inclusion of a suitable indicator such as an audible or visible warning device, the flow of current derived from the emergency train line and fed via the brake release train line to a converter of one of the analogue brake units can be utilised to enunciate to the driver that the brake release train line is being used to effect release of a brake which is not otherwise releasable by the analogue electronic blending unit. Whilst therefore only one such fault is in existence, the driver is able to operate the train with all brakes released until appropriate measures can be taken to diagnose the fault. This is particularly useful where a fault occurs in a confined tunnel as in an underground railway system.

The principles of emergency braking are well known in the art but it may be observed that in the present arrangement, a break in the emergency train line loop such as may be caused by an interrupted coupling or a complete parting of a train, immediately interrupts the supply of current to the isolating current transformer such as 11 of the analogue electronic blending units throughout the train with the result that the current in the output line 6 which supplies the E.P. converter 21 falls to an emergency braking level and the E.P. converter produces an output pressure which limited only by the load cut-off valve 23, is applied to the relay valve 24 to call for an emergency level of braking to be applied to the brake cylinders.

Figure 6:
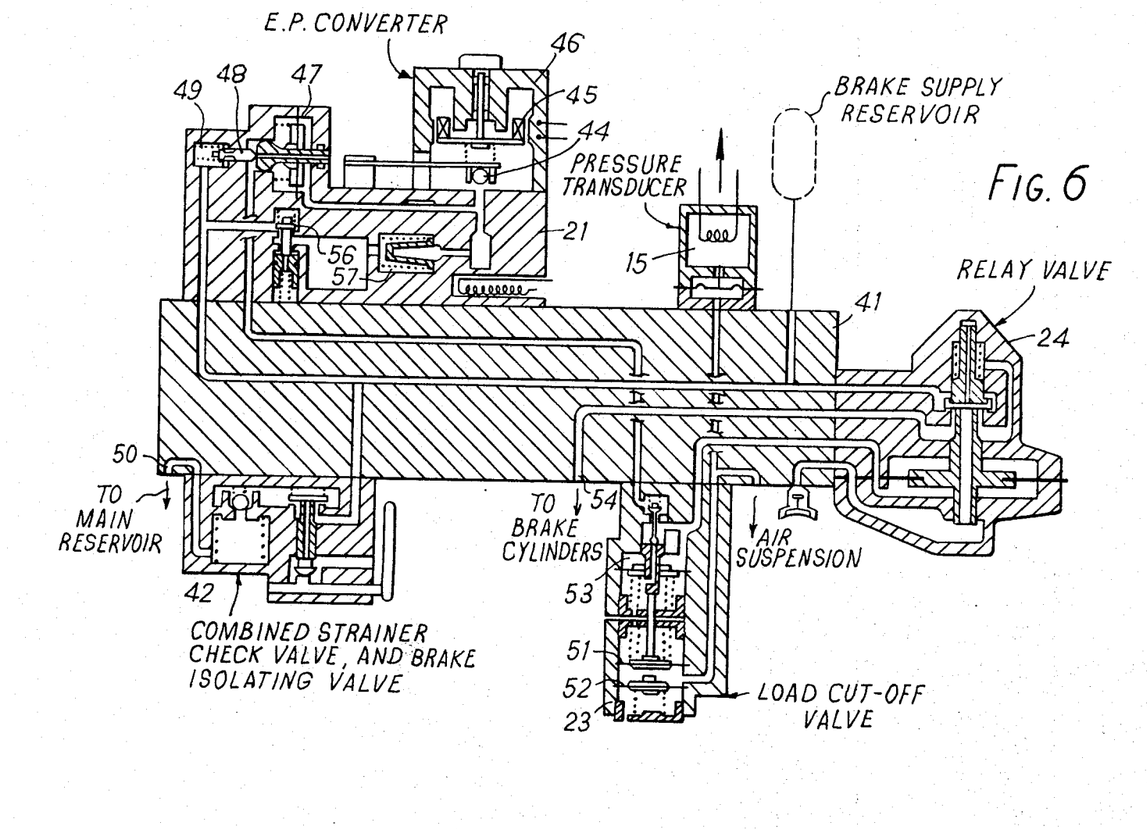
FIG. 6 illustrates in greater detail an electro-pneumatic brake unit utilised in the apparatus of FIG. 3.

Referring now to the operation of the analogue electro-pneumatic brake unit as represented by the dotted outline 2, this is illustrated in slightly more detail in the drawing of FIG. 6. This drawing shows the analogue E.P. brake unit and mounted on the brake unit there is provided the pressure transducer 15 which is already mentioned in connection with FIG. 3, described above. The unit as a whole comprises a central manifold portion denoted by reference 41 to which there are mounted in addition to the pressure transducer 15, the E.P. converter 21 referred to above with reference to FIG. 1, a combined strainer and check valve 42 with a built-in isolating valve which is manually operable to isolate the unit from the main reservoir at 50 and vent the unit. The load cut-off valve 23 which corresponds to the valve 23 of FIG. 1 is also shown together with the relay valve 24 also referred to above. The E.P. converter consists essentially of a spring mounted valve comprising a ball 44, the thrust upon which towards the valve seat is adjustable by means of the current applied to a coil 45 of an armature mounted in the field of a magnetic yoke 46. Such a converter is described in application Ser. No. 224,057, now U.S. Pat. No. 3,799,498 and in the case of the converter 21, this has a small associated relay valve having a pressure responsive member 47 for operating a valve member 48 against the thrust of a bias spring 49. The relay valve is supplied via the combined strainer and check valve 42 from a main reservoir which is normally connected to the port 50. The relay valve thus relays pressure from a brake supply reservoir shown dotted and charged from the combined strainer and check valve to the load cut-off valve 23 which, as mentioned above, is such as to operate normally only for emergency applications and the pressure which it permits to pass to the relay valve 24 is dependent upon the input fluid pressure applied from an air suspension between pressure responsive members 51 and 52, the cut-off valve itself being operated by the pressure responsive member 51, which is balanced in the lap position by the output pressure applied above a further pressure responsive member 53. The pressure responsive member 52 is such as to normally be in the position shown when air suspension pressure exists but to be urged upwardly by the thrust of a bias spring to urge the load cut-off valve into a condition in which it enables crush loaded emergency braking supply to be applied to the relay valve 24 in the event of the air suspension pressure disappearing. The relay valve 24 is of conventional form and supplies pressure from the brake supply reservoir to the brake cylinders which are connected to an output port 54, this pressure being dependent upon the pressure which is derived from the E.P. converter 21 via the load cut-off valve.

Not hitherto mentioned is a pressure limiting valve denoted by the reference 56 and a filter denoted by reference 57 for supplying air pressure to the E.P. converter. However, these, along with the operation of the E.P. converted will be more fully understood having reference to the above-numbered patent application.

Having thus described our invention what we claim is:

1. Rail train vehicle apparatus including a control signal input for receiving, in common with other vehicles of a train, an analog control signal input representing a desired degree of braking, an a.c. supply input for receiving, in common with other vehicles of the train, an a.c. supply current, and electrically operating braking control signal processing apparatus which is connected to said control signal input and said a.c. supply input and further receives an input representative of dynamic braking and which, in operation, is powered, apart from the control signal, only by the power derived from the a.c. supply current, for producing a brake control signal output for an electro-pneumatic brake.

2. Rail train vehicle apparatus as claimed in claim 1, including a brake release input and an electro-pneumatic conversion means responsive to energisation of the brake release input by a release signal for effecting a release of the brake independently of the control signal input.

3. Rail train vehicle apparatus as claimed in claim 1, wherein said analog signal comprises a d.c. analog signal and wherein said control signal processing apparatus further includes an electro-pneumatic conversion means, and a d.c. current transformer and rectifier which receive said d.c. current signal and are energized from said a.c. signal input to provide an input current to said electro-pneumatic conversion means.

4. Rail train vehicle braking apparatus as claimed in claim 3 wherein said control signal processing apparatus includes an inverter modulator operable in response to the output of said transformer and rectifier to produce an inverted output signal, the magnitude of which varies in inverse relationship relative to the d.c. analog signal, and means responsive to said inverted output signal and a signal representative of the loading of the vehicle to produce a further load-weighed signal which is connected to said electro-pneumatic conversion means.

5. Rail train vehicle braking apparatus as claimed in claim 1 wherein said analog signal is a variable mark-space d.c. signal and said control signal processing apparatus further includes a first gate which is connected to said a.c. signal input and is operable to gate out the a.c. input thereto in accordance with the mark-to-space ratio of said d.c. signal, a transducer connected to receive the output of said first gate for producing a load-weighed output dependent upon the vehicle loading, inverter means connected to receive said d.c. signal, a further gate connected to said a.c. signal input and to the output of said inverter means for gating out the a.c. signal input thereto in inverse relationship to the mark-to-space ratio of said d.c. signal so as to produce a further output signal, and means for combining said further output signal with the load-weighed signal to produce a brake control signal related to the weight of the vehicle.

6. Rail train vehicle braking apparatus as claimed in claim 1 wherein said analog signal is a d.c. signal having a variable mark-space ratio, and said signal processing apparatus includes gate means for gating out the a.c. signal input thereto in relationship to the mark-to-space ratio of said d.c. signal.

* * * * *